(12) United States Patent
Saebi

(10) Patent No.: US 8,262,321 B1
(45) Date of Patent: Sep. 11, 2012

(54) METHODS OF PROVIDING MAN-MADE ISLANDS

(76) Inventor: Nasser Saebi, Glendale, AZ (US)

( * ) Notice: Subject to any disclaimer, the term of this patent is extended or adjusted under 35 U.S.C. 154(b) by 0 days.

(21) Appl. No.: 12/928,855

(22) Filed: Dec. 20, 2010

Related U.S. Application Data

(63) Continuation of application No. 12/455,855, filed on Jun. 6, 2009, now abandoned.

(60) Provisional application No. 61/131,194, filed on Jun. 6, 2008.

(51) Int. Cl.
*B63B 35/44* (2006.01)

(52) U.S. Cl. ............ 405/219; 405/195.1; 114/264; 114/266

(58) Field of Classification Search .......... 405/195.1, 405/219; 114/264, 266
See application file for complete search history.

(56) References Cited

U.S. PATENT DOCUMENTS

| | | | | | |
|---|---|---|---|---|---|
| 3,913,336 | A | * | 10/1975 | Figari | 405/222 |
| 3,970,024 | A | * | 7/1976 | Fisher | 114/266 |
| 4,318,361 | A | * | 3/1982 | Sluys | 114/264 |
| RE31,984 | E | * | 9/1985 | Sluys | 405/219 |
| 5,044,296 | A | * | 9/1991 | Finn | 114/266 |
| 5,133,276 | A | * | 7/1992 | Alesi et al. | 114/264 |
| 5,483,913 | A | * | 1/1996 | Ohkawa et al. | 114/264 |
| 6,199,502 | B1 | * | 3/2001 | Mattson | 114/266 |
| 7,234,410 | B2 | * | 6/2007 | Quigley et al. | 114/264 |

* cited by examiner

*Primary Examiner* — Frederick L Lagman
(74) *Attorney, Agent, or Firm* — Albert W Davis, Jr.

(57) ABSTRACT

This invention relates to the creation of man-made islands and other like floating structures using composite materials, such as plastic foam coated with a Fiber Reinforced Coating (FRC), such as Glass Fiber Reinforced Concrete (GFRC).

7 Claims, 2 Drawing Sheets

METHODS OF PROVIDING MAN-MADE ISLANDS

CROSS-REFERENCE TO RELATED APPLICATIONS

This application is continuation of nonprovisional patent application Ser. No. 12/455,855 filed Jun. 6, 2009 now abandoned by Nasser Saebi for METHODS OF PROVIDING MAN-MADE ISLANDS which claims priority to provisional patent application Ser. No. 61/131,194 filed Jun. 6, 2008 by Nasser Saebi for METHODS OF PROVIDING MAN-MADE ISLANDS.

INCORPORATED BY REFERENCE

The following references are incorporated by reference: U.S. Pat. No. 6,308,490 issued Oct. 30, 2001 and U.S. Pat. No. 6,912,488 issued Jun. 28, 2005 to Nasser Saebi for Method of Constructing Curved Structures as Part of a Habitable Building, U.S. Pat. No. 6,721,684 issued Apr. 13, 2004 and U.S. Pat. No. 6,985,832 issued Jan. 10, 2006 to Nasser Saebi for Method of Manufacturing and Analyzing a Composite Building.

BACKGROUND OF THE INVENTION

Man-made islands have been constructed by moving sand from one location to another location. This is a very expensive proposition.

BRIEF DESCRIPTION OF THE INVENTION

This invention relates to the creation of man-made islands and other like floating structures using composite materials, such as plastic foam coated with a Fiber Reinforced Coating (FRC), such as Glass Fiber Reinforced Concrete (GFRC).

Another alternative is to build a man-made island from materials that are impervious to water and can be fastened to or supported by pilings from the bottom of the water body (sea, ocean, gulf, lake, pond, etc.).

In one embodiment of this invention, plastic foam blocks (16 feet×49 inches×31 inches) are coated with a suitable FRC, such as GFRC. A coating of 0.25 inches of GFRC can be applied to all surfaces. After a suitable setting time, the coated blocks are bonded to each other using a FRC, such as GFRC or another suitable bonding agent. The blocks can be staggered vertically and horizontally.

As an example, the depth of the island can be two blocks (~60 inches/5 feet). If the plastic used is 1.5 pounds/cu ft Expanded PolyStyrene (EPS), the weight of a cubic foot of EPS will be 1.5 pounds. The weight of a cubic foot of water is 62.5 pounds. Therefore, the block island will float with a loading of less than 5 feet×~60 pounds/cu ft or 300 pounds/square foot.

After the foam blocks are bonded together to form a portion of the island. The portion constructed could be the size of a football field (300 feet×100 feet). The coating and bonding could be done on land in an area that can be flooded with water to allow the portion of the island to be floated to the location for the island.

Portions of the island are bonded together to form the island. The island or portions of the island are moored to the floor of the water body or other suitable fixed object using cables or other cable-like means and sea anchors or other anchoring means.

Earth and other landscaping may be added to the island portions to add ballast during transport to the island site.

In another embodiment of this invention, plastic foam blocks (16 feet×49 inches×31 inches) are bonded together to form a portion of the island. The portion constructed could be the size of a football field (300 feet×100 feet). The assembly and bonding could be done on land in an area that can be flooded with water to allow the portion of the island to be floated to the location for the island.

Once the depth or thickness of the blocks (for example, 4-8 feet) has been achieved over the area of the island portion, then the top and sides of the foam structure created by the blocks is coated with a suitable FRC, such as GFRC.

The sides and top are coated with FRC, such as GFRC, and the bottom can be coated or left bare or uncoated. All of the sides or at least some of the sides can be left uncoated. To make a stronger island portion, all of the sides can be coated. Then coating the bottom of the island portion will add additional strength.

Then, the water is allowed in to float the island portion. The portion then can be floated to the island site.

Alternatively, the portion can be made on a barge and transported to the island site in smaller portions.

DETAILED DESCRIPTION OF THE INVENTION

Figure 1:
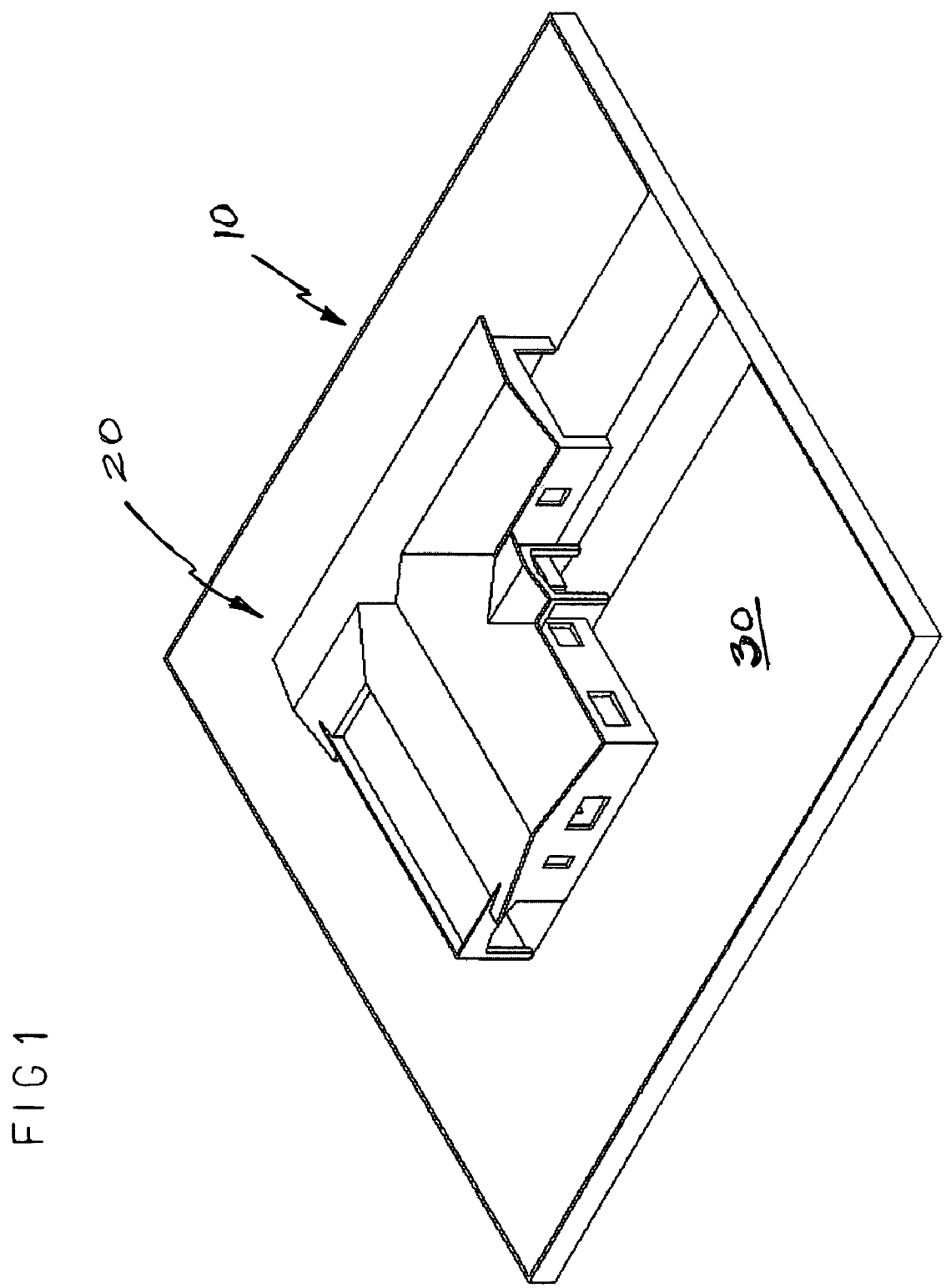
FIG. 1 shows a perspective view of a house or building and an island or a portion of an island of the invention.

FIG. 1 shows island portion 10 with house 20 and landscaping 30. Island portion 10 is formed from plastic foam with a FRC coating, such as GFRC. The island portion could be moored to land which abuts the body of water or moored to the bottom of the body of water.

The island portion 10 can be joined to another island portion which can provide a road for automobile travel or other conveyance. Another island portion which is similar to island portion 10 can be joined to island portion 10 to provide more building areas on the island.

The building 20 can be built before the other island portions are added and before the island portion 10 is transported to the body of water.

Alternatively, the island or large portions of the island can be built and then the buildings 20 added.

Figure 2:
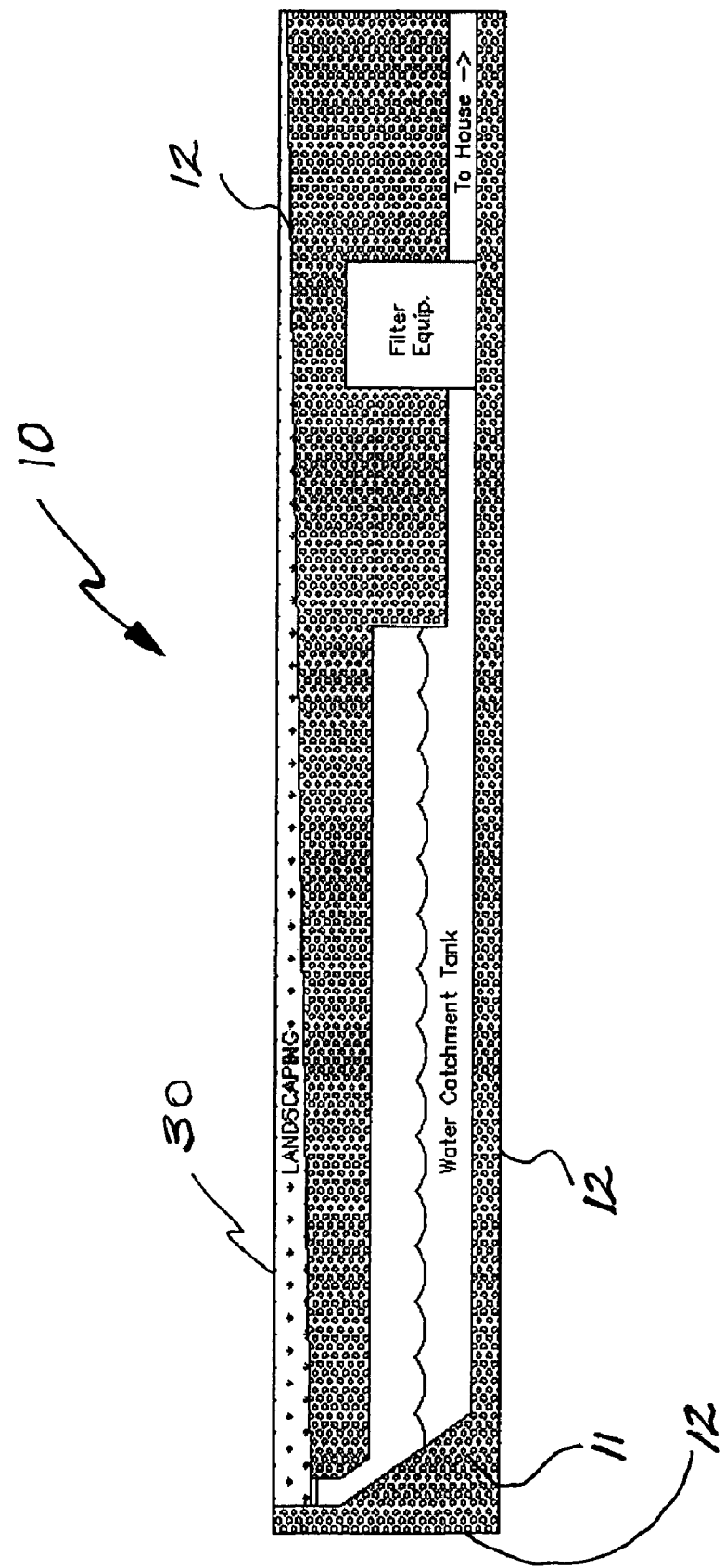
FIG. 2 is a cross-sectional view of a portion of the island.

FIG. 2 shows the island 10 with landscaping 30. The landscaping can be formed from suitable materials such as sand, dirt, etc.

The FRC/GFRC surface of the island has an inclination towards a water catchment tank which allows the island to catch rainwater and reuse it. Filter equipment and pumps can be provided to move the water to points of use. The tank is situated in the plastic foam 11.

The plastic foam 11 is shown schematically here since it may be made of two pieces of foam in thickness. Preferably the top and side surfaces of the foam island are coated with a FRC, such as GFRC. However, the sides can be left bare or uncoated.

The portions of the island are brought together and bonded to each other using a suitable bonding agent. A suitable bonding agent is GFRG. The bond between GFRC and GFRC has a strength of 70 psi. The bond between GFRC and foam (EPS) has a strength of 40 psi. A tongue and groove connection between the island portions can be provided in the outer surface if desired. The island portion 10 can be coated with 0.25 inches of GFRC for example. The bonding agent, GFRC, can be 0.25 inches or more.

A Finite Element Analysis has been done on the island portion with the building on the portion, and the results proved that the invention provided an acceptable structure for use as a floating island.

Various changes and modifications to the embodiments herein chosen for purposes of illustration will readily occur to those skilled in the art.

The FRC can be a Glass Fiber Reinforced Concrete (GFRC) or a Fiber Reinforced Polymer (FRP). The fibers can be plastic, glass, carbon, single-wall carbon nanotubes (SWNTs or Buckytubes), Aramid or other fibers. The Polymer can be Epoxies, Polyesters, Vinlyesters or other materials.

The coating also can be without fibers if the design loading is low enough. For the strongest structure, fibers should be added to the coating. The number of coats of the coating and the composition of those coats can be varied.

Bonding agents that bond foam to foam, foam to concrete and concrete to concrete can be structural or non-structural as certified by International Code Council (ICC). One structural bonding agent is Glass Fiber Reinforced Concrete (GFRC). A thickness of 0.25-0.50 inches is suitable.

A formula for GFRC is:
1 bag of cement (Portland Cement Type III)—94 pounds,
No. 30 silica sand—100 pounds,
water and ice—25 pounds,
polymer (Forton™ VF-774)—12 pounds,
retarder (Daratard™ 17)—2-5 ounces,
plasticizer (Daracem™ 19)—2-6 ounces,
0.5 inch glass fibers (Cem-FIL™ or Nippon AR™)—1.5 pounds and
1.5 inch glass fibers—1.5 pounds.

A non-structural bonding agent can be expansive plastic foams, such as Expansive PolyUrethane (EPU), etc. This can be used where the joint strength need not be structural, such as a joint that is later covered with FRC to create structural strength.

The type of plastic foam can be different from Expanded PolyStyrene (EPS). The EPS can have a density of 1.5 pounds per cu. ft. (nominal) which is actually 1.35 pounds per cu. ft. (actual). EPS was used because a Finite Element Analysis was done using EPS and GFRC. Suitable plastic foam could be PU, EPS, etc.

The specific materials used to build the structure may be varied, such as the type of plastic foam, the bonding agents, the coatings, etc.

To the extent that such modifications and variations do not depart from the spirit of the invention, they are intended to be included within the scope of the invention.

I claim:

1. A method of constructing a man-made island from a composite material of a plastic foam coated with a fiber reinforced coating or FRC, comprising the following steps,
   providing blocks of plastic foam, the blocks having top, bottom and side surfaces,
   joining the blocks by a bonding agent which is a FRC applied to adjacent side surfaces of the blocks to form an island having a top and bottom surface and side surfaces, the island being at least 100 feet wide by 100 feet long,
   coating the top surface of the island with a FRC,
   coating the side surfaces of the island with a FRC,
   constructing a building and road on the top surface of the island and floating the island.

2. The method of claim 1 wherein
   the foam being expanded polystyrene.

3. The method of claim 1 wherein
   the FRC being glass fiber reinforced concrete.

4. The method of claim 1 including the step of
   coating the sides with a FRC before joining the blocks.

5. The method of claim 1 including the step of
   coating the bottom surface of the blocks with a FRC before joining.

6. A method of constructing a man-made island from a composite material of a plastic foam coated with a fiber reinforced coating or FRC, comprising the following steps,
   providing blocks of plastic foam, the blocks having top, bottom and side surfaces,
   coating at least the top and side surfaces of the blocks with a FRC,
   joining the coated blocks by a bonding agent which is a FRC applied to adjacent side surfaces of the blocks to form an island having a top and bottom surface and side surfaces, the island being at least 100 feet wide by 100 feet long,
   floating the island and
   constructing a building and road on the top surface of the island.

7. The method of claim 6 including the step of
   coating the bottom surfaces with a FRC.

* * * * *